United States Patent
Chen

(10) Patent No.: US 11,200,868 B2
(45) Date of Patent: Dec. 14, 2021

(54) ELECTRONIC DEVICE, LIGHT SENSING AND BRIGHTNESS CONTROLLING METHOD AND APPARATUS

(71) Applicant: BEIJING XIAOMI MOBILE SOFTWARE CO., LTD., Beijing (CN)

(72) Inventor: Chaoxi Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/983,362

(22) Filed: Aug. 3, 2020

(65) Prior Publication Data

US 2021/0248976 A1 Aug. 12, 2021

(30) Foreign Application Priority Data

Feb. 10, 2020 (CN) .......................... 202010087710.8

(51) Int. Cl.
| | |
|---|---|
| *G09G 5/10* | (2006.01) |
| *G01J 1/42* | (2006.01) |
| *G01J 1/44* | (2006.01) |
| G09G 3/3208 | (2016.01) |
| G09G 3/34 | (2006.01) |

(52) U.S. Cl.
CPC .............. *G09G 5/10* (2013.01); *G01J 1/4204* (2013.01); *G01J 1/4228* (2013.01); *G01J 1/44* (2013.01); *G09G 3/3208* (2013.01); *G09G 3/3406* (2013.01); *G09G 2320/0626* (2013.01); *G09G 2360/141* (2013.01); *G09G 2360/144* (2013.01)

(58) Field of Classification Search
None
See application file for complete search history.

(56) References Cited

U.S. PATENT DOCUMENTS

| | | |
|---|---|---|
| 2016/0005362 A1 | 1/2016 | Chen et al. |
| 2016/0372053 A1* | 12/2016 | Lee ....................... G09G 3/3406 |
| 2020/0043423 A1 | 2/2020 | Lee et al. |
| 2020/0382739 A1* | 12/2020 | Lu ............................ G09G 5/10 |

FOREIGN PATENT DOCUMENTS

WO WO 2016/204471 A1 12/2016

OTHER PUBLICATIONS

Extended European Search Report dated Feb. 5, 2021 in corresponding European Patent Application No. 20191428.0, 14 pages.

* cited by examiner

*Primary Examiner* — Aneeta Yodichkas
(74) *Attorney, Agent, or Firm* — Oblon, McClelland, Maier & Neustadt, L.L.P.

(57) ABSTRACT

The present disclosure relates to an electronic device, a method, and an apparatus for light sensing and brightness controlling. The electronic device can include a device body, a screen module, and a light sensing module electrically connected to the screen module. The device body includes a first assembly surface and a second assembly surface arranged opposite to each other. The screen module can be arranged on the first assembly surface. The light sensing module includes a first light sensing unit and a second light sensing unit, where the first light sensing unit is arranged on the first assembly surface, and the second light sensing unit is arranged on the second assembly surface.

12 Claims, 9 Drawing Sheets

ELECTRONIC DEVICE, LIGHT SENSING AND BRIGHTNESS CONTROLLING METHOD AND APPARATUS

CROSS-REFERENCE OF RELATED APPLICATIONS

The present application is based on and claims priority to Chinese patent application No. 202010087710.8, filed on Feb. 10, 2020, the disclosure of which is incorporated herein by reference in its entirety.

TECHNICAL FIELD

The present disclosure relates to the field of electronic technologies, and in particular, to an electronic device, a light sensing and brightness controlling method and a light sensing and brightness controlling apparatus.

BACKGROUND

Screen brightness of an electronic device, such as a mobile phone, affects viewing comforts of human eyes under different ambient light, and thus the user experience of the electronic device. Therefore, adjusting the screen brightness according to the ambient light can improve the viewing comforts of the human eyes and the user experience of the electronic device in different scenarios. However, a single one light sensing unit provided on the front of the electronic device may not at the same time sense the ambient light at different spatial positions in a current scenario, which affects the adaptability of the screen brightness to the ambient light.

SUMMARY

The present disclosure provides an electronic device, a light sensing and brightness controlling method and a light sensing and brightness controlling apparatus, so as to increase the ambient light sensing angle of the electronic device, and to improve the adaptability of the screen brightness to the ambient light. According to a first aspect, an electronic device is provided that can include a device body having a first assembly surface and a second assembly surface arranged opposite to each other, a screen module arranged on the first assembly surface, and a light sensing module electrically connected to the screen module. The light sensing module can include a first light sensing unit arranged on the first assembly surface, and a second light sensing unit arranged on the second assembly surface.

Optionally, the screen module is provided with a light transmitting area, and the first light sensing unit is disposed beneath the screen module and corresponding to the light transmitting area. The screen module can include a display layer and a light shielding layer, and the display layer includes a top surface and a bottom surface disposed opposite to each other, where the light shielding layer is disposed on the bottom surface, and a portion of the light shielding layer that is corresponding to the light transmitting area is provided with a light transmitting portion.

Optionally, the electronic device can include one or more elastic positioning members that are mated with the first light sensing unit and the second light sensing unit, such that positions of the first light sensing unit and the second light sensing unit are fixed. Additionally, the electronic device can further include a first self-luminous member arranged on the first assembly surface and/or a second self-luminous member arranged on the second assembly surface, where a distance between the first self-luminous member and the first light sensing unit is greater than 20 mm, and a distance between the second self-luminous member and the second light sensing unit is greater than 20 mm.

The electronic device may further include a first infrared emitting element arranged on the first assembly surface and/or a second infrared emitting element arranged on the second assembly surface. A distance between the first infrared emitting element and the first light sensing unit is greater than 20 mm, and a distance between the second infrared emitting element and the second light sensing unit is greater than 20 mm.

Optionally, the electronic device further includes a camera module arranged on the second assembly surface. The camera module includes a camera body and a cover plate covering the camera body, and the second light sensing unit is disposed beneath the cover plate. The cover plate can include an outer side surface and an inner side surface opposite to each other, and a light transmitting ink layer is provided on a portion of the inner side surface that is corresponding to the second light sensing unit.

In an embodiment, the light transmitting ink layer can have a characteristic dimension greater than a characteristic dimension of the second light sensing unit. The light transmitting ink layer can have the characteristic dimension greater than or equal to 0.6 mm. Further, the light transmitting ink layer can have a light transmittance higher than 0.2%.

Optionally, a distance between the inner side surface and a light sensing surface of the second light sensing unit can be less than or equal to 2.6 mm. A second light diffusing layer covering the light transmitting ink layer can be further provided on the light transmitting ink layer. The second light sensing unit can have a light receiving angle greater than or equal to 35°.

According to a second aspect of the present disclosure, a light sensing and brightness controlling method is provided. The light sensing and brightness controlling method is applied to the electronic device, and the light sensing and brightness controlling method can include receiving a first light sensing parameter of the first light sensing unit and a second light sensing parameter of the second light sensing unit, and determining whether the second light sensing parameter is less than a preset value. The method can further include, in response to the second light sensing parameter being less than the preset value, adjusting a brightness of the screen module based on the first light sensing parameter. Otherwise adjusting the brightness of the screen module based on the second light sensing parameter.

According to a third aspect of the present disclosure, a light sensing and brightness controlling apparatus is provided. The light sensing and brightness controlling apparatus is applied to the electronic device, and the light sensing and brightness controlling apparatus can include at least one processor and at least one memory coupled to the at least one processor having machine-executable instructions thereon. When the instructions are executed by the at least one processor, they cause the light sensing and brightness controlling apparatus to receive a first light sensing parameter of the first light sensing unit and a second light sensing parameter of the second light sensing unit, and determine whether the second light sensing parameter is less than a preset value. Further, the apparatus can, in response to the second light sensing parameter being less than the preset value, adjust a brightness of the screen module based on the first light sensing parameter. Otherwise, the apparatus can adjust the brightness of the screen module based on the second light sensing parameter.

According to a fourth aspect of the present disclosure, a computer-readable storage medium having computer instructions stored thereon is provided, where when the instructions are executed by a processor, the steps of the light sensing and brightness controlling method are implemented.

The technical solutions provided by the examples of the present disclosure may include the beneficial effects. For example, the light sensing module of the present disclosure includes the first light sensing unit and the second light sensing unit, and the first light sensing unit is arranged on the first assembly surface of the device body, and the second light sensing unit is arranged on the second assembly surface of the device body. As such, since the first assembly surface and the second assembly surface are arranged opposite to each other, the first light sensing unit and the second light sensing unit may sense the ambient light on the opposite sides of the device body, and adjust the brightness of the screen module arranged on the first assembly surface with reference to changes in the ambient light on both sides of the device body. The above structural arrangement may increase the ambient light sensing angle of the electronic device, and further increase the cover area of the sensed ambient light, which improves the adaptability of the screen brightness to the ambient light.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Embodiments will be described in detail herein, examples of which are illustrated in the accompanying drawings. When the following descriptions involve the drawings, like numerals in different drawings refer to like or similar elements unless stated otherwise. The implementations described in the following examples do not represent all embodiments consistent with the present disclosure. Rather, they are merely examples of apparatuses and methods consistent with some aspects of the present disclosure as recited in the appended claims.

Figure 1:
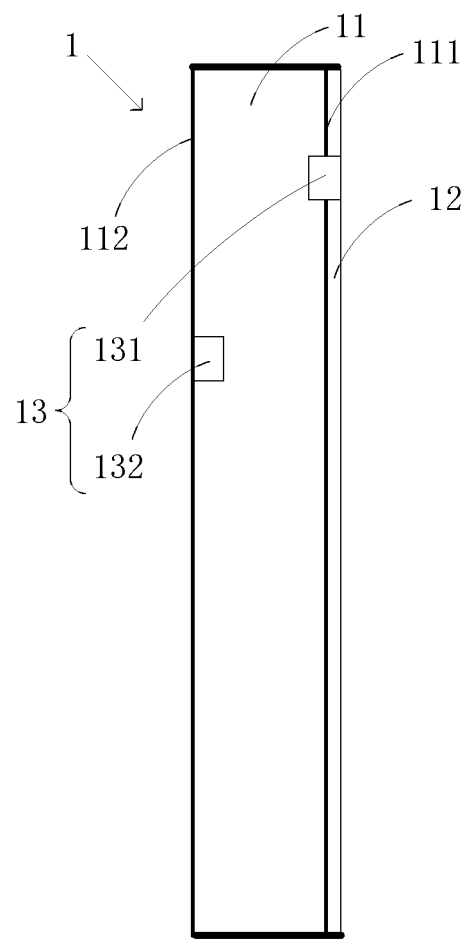
FIG. 1 is a first cross-sectional view of an electronic device in an example of the present disclosure.

FIG. 1 is a first cross-sectional view of an electronic device in an example of the present disclosure. As shown in FIG. 1, the electronic device 1 can include a device body 11, a screen module 12, and a light sensing module 13 electrically coupled with the screen module 12. The device body 11 includes a first assembly surface 111 and a second assembly surface 112 arranged opposite to each other, and the screen module 12 is arranged on the first assembly surface 111. The light sensing module 13 includes a first light sensing unit 131 and a second light sensing unit 132. The first light sensing unit 131 is arranged on the first assembly surface 111, and the second light sensing unit 132 is arranged on the second assembly surface 112.

In the above example, the light sensing module 13 includes the first light sensing unit 131 and the second light sensing unit 132, and the first light sensing unit 131 is arranged on the first assembly surface 111 of the device body 11, and the second light sensing unit 132 is arranged on the second assembly surface 112 of the device body 11. As such, since the first assembly surface 111 and the second assembly surface 112 are arranged opposite to each other, the first light sensing unit 131 and the second light sensing unit 132 may sense the ambient light on the opposite sides of the device body 11, and may adjust the brightness of the screen module 12 arranged on the first assembly surface 111 with reference to changes in the ambient light on both sides of the device body 11. The above structural arrangement may increase the ambient light sensing angle of the electronic device 1, and further increase the cover area of the sensed ambient light, which improves the adaptability of the screen brightness to the ambient light.

The arrangement of the first light sensing unit 131 and the second light sensing unit 132 will be respectively illustrated below. The screen module 12 is provided with a light transmitting area 123. The first light sensing unit 131 is disposed beneath the screen module 12 and spatially corresponding to the light transmitting area 123. The first light sensing unit 131 receives ambient light at a side of the electronic device 1 through the light transmitting area 123, and generates data of the ambient light.

In some examples, as shown in FIG. 1, a display area of the screen module 12 may fully cover the first assembly surface 111 of the device body 11 to form a full-screen display effect. When the display area of the screen module 12 covers the entire area of the first assembly surface 111, the light transmitting area 123 may be provided in the display area of the screen module 12, and the first light sensing unit 131 may be provided beneath the screen module 12 and spatially corresponding to the light transmitting area 123. The light transmitting area 123 may be a light transmitting hole opened in the display area of the screen module 12 or a hidden light transmitting area 123 provided in the display area of the screen module 12. The influence on the entire display effect of the screen module 12 may be avoided via the hidden light transmitting area 123.

In other examples, the display area of the screen module 12 may cover a part of the first assembly surface 111 of the device. When the display area of the screen module 12 covers the part of the first assembly surface 111, the light transmitting area 123 may be provided in a non-display area of the screen module 12, and the first light sensing unit 131 may be provided beneath the screen module 12, and spatially corresponding to the light transmitting area 123. Alternatively, the light transmitting area 123 may be provided in the display area of the screen module 12, and the first light sensing unit 131 may be disposed beneath the screen module 12 and spatially corresponding to the light transmitting area 123. The light transmitting area 123 may be a light transmitting hole opened in the display area or non-display area of the screen module 12, or a hidden light transmitting area 123 may be provided in the display area of the screen module 12. The influence on the entire display effect of the screen module 12 may be avoided via the hidden light transmitting area 123.

Figure 2:
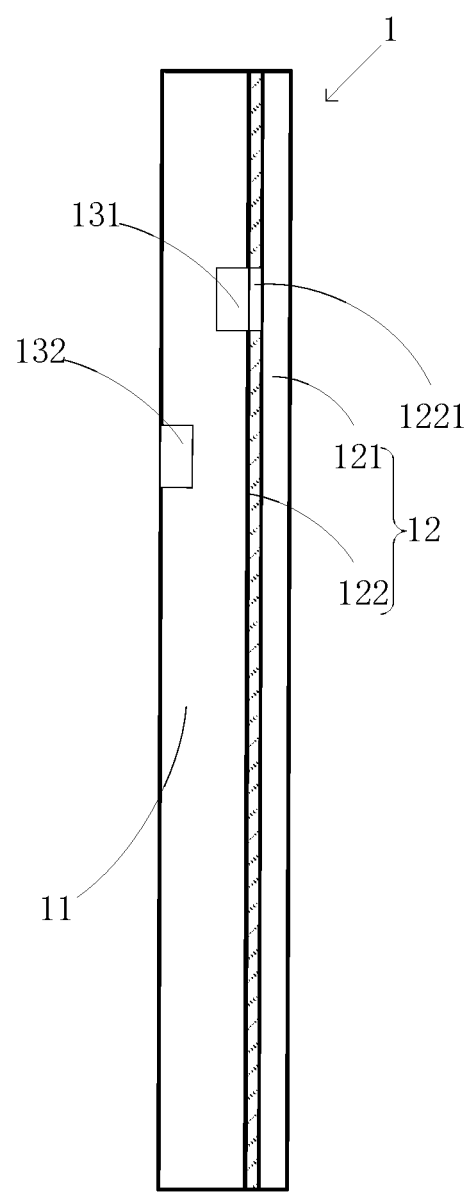
FIG. 2 is a second cross-sectional view of an electronic device in an example of the present disclosure.

Further, as shown in FIG. 2, the screen module 12 includes a display layer 121 and a light shielding layer 122. The display layer 121 includes top and bottom surfaces disposed opposite to each other, the light shielding layer 122 is disposed on the bottom surface, and a portion of the light shielding layer 122 which is corresponding to the light transmitting area 123 is provided with a light transmitting portion 1221. A bottom part of the screen module 12 is usually provided with the light shielding layer 122 which is configured to enable the screen module 12 to be shockproof and heat-conducting. By providing the light transmitting portion 1221 on the light shielding layer 122, the external ambient light may be incident on the first light sensing unit 131 through the light transmitting portion 1221, thereby preventing the structure of the screen module 12 from interfering in the light propagation.

Figure 3:
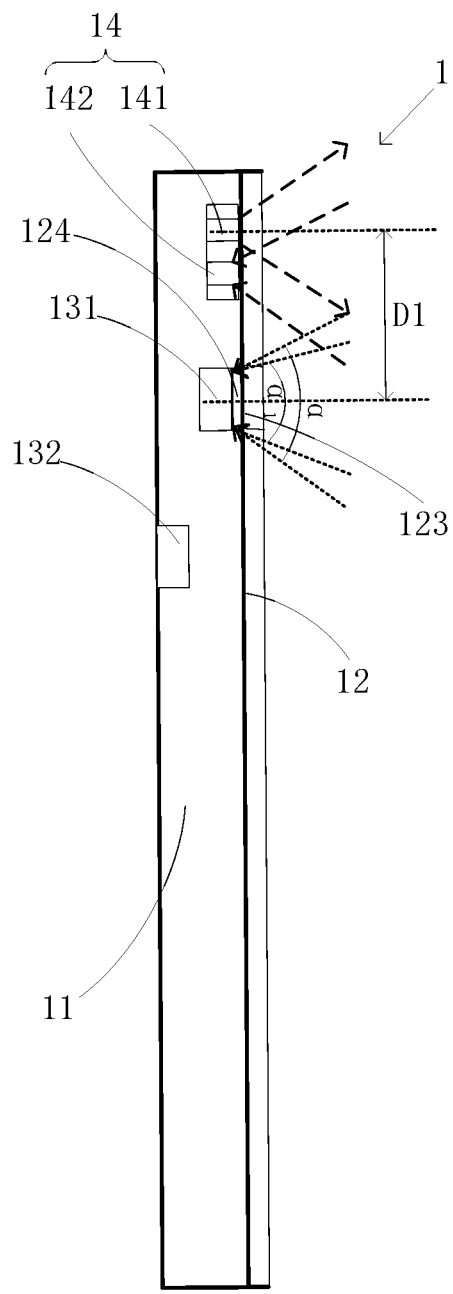
FIG. 3 is a third cross-sectional view of an electronic device in an example of the present disclosure.

As shown in FIG. 3, the first light sensing unit 131 is disposed beneath the display area of the screen module 12, and a first distance sensing module 14 is also provided beneath the screen module 12. The first distance sensing module 14 includes a first infrared emitting element 141 and a first infrared receiving element 142. A distance D1 between the first infrared emitting element 141 and the first light sensing unit 131 is greater than 20 mm, which may prevent the infrared emission from interfering in the sensing of the first light sensing unit 131. The first light sensing unit 131 receives the ambient light at the side of the first assembly surface 111 through the light transmitting area 123 of the display area of the screen module 12, and forms a light receiving angle α as shown in FIG. 3. The first distance sensing module 14 may be used as a distance sensing means to realize the distance sensing function by emitting the infrared light.

In one example, an inner surface of the screen module 12 is further provided with a first light diffusing layer 124 covering the light transmitting area 123. The first light diffusing layer 124 may increase the angle for receiving the external ambient light, improve the uniformity of the light incident on the first light sensing unit 131, and further improve the light sensing effect of the first light sensing unit 131. As shown in FIG. 3, after additionally providing the first light diffusing layer 124, the light receiving angle of the first light sensing unit 131 increases from $α_1$ to α.

In the above example, the screen module 12 may include an OLED (Organic Light-Emitting Diode) display screen, or an LCD (Liquid Crystal Display) display screen, which is not limited in the present disclosure. When the screen module 12 is the OLED display screen, the screen module 12 realizes the display of content through self-illumination, and the light sensing module 13 is electrically connected to the screen module 12 to control the self-illumination brightness of the screen module 12, so as to adapt to the ambient light. When the screen module 12 is the LCD display screen, the screen module 12 realizes the display of content through a backlight source, and the light sensing module 13 is electrically connected to the backlight source to control the display brightness of the screen module 12, so as to adapt to the ambient light.

Figure 4:
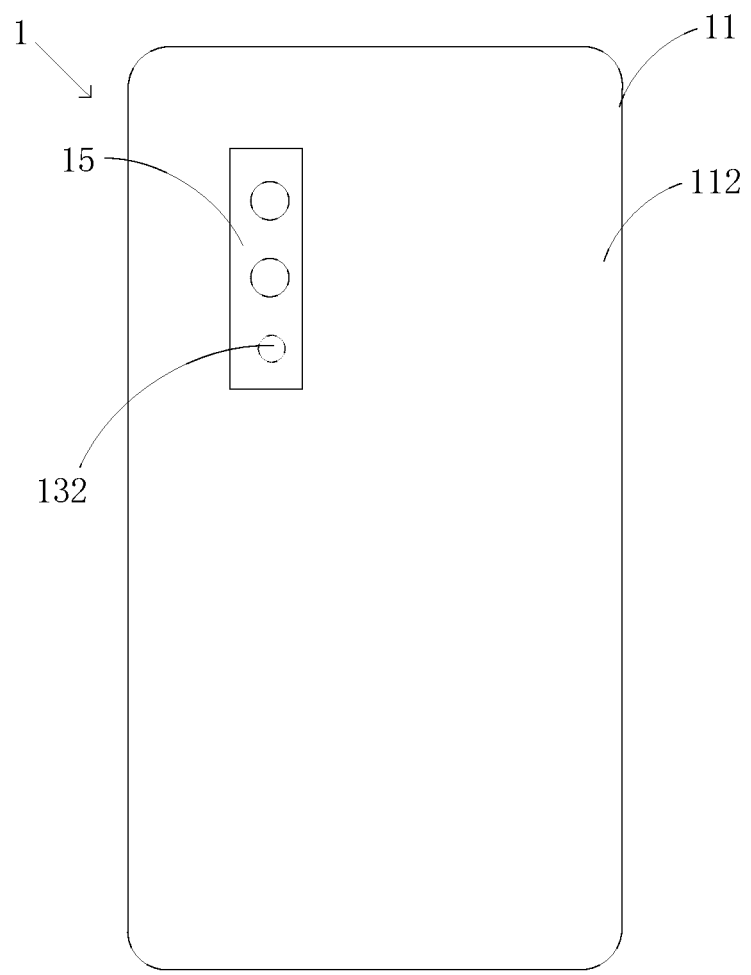
FIG. 4 is a schematic diagram illustrating a back structure of an electronic device in an example of the present disclosure.
Figure 5:
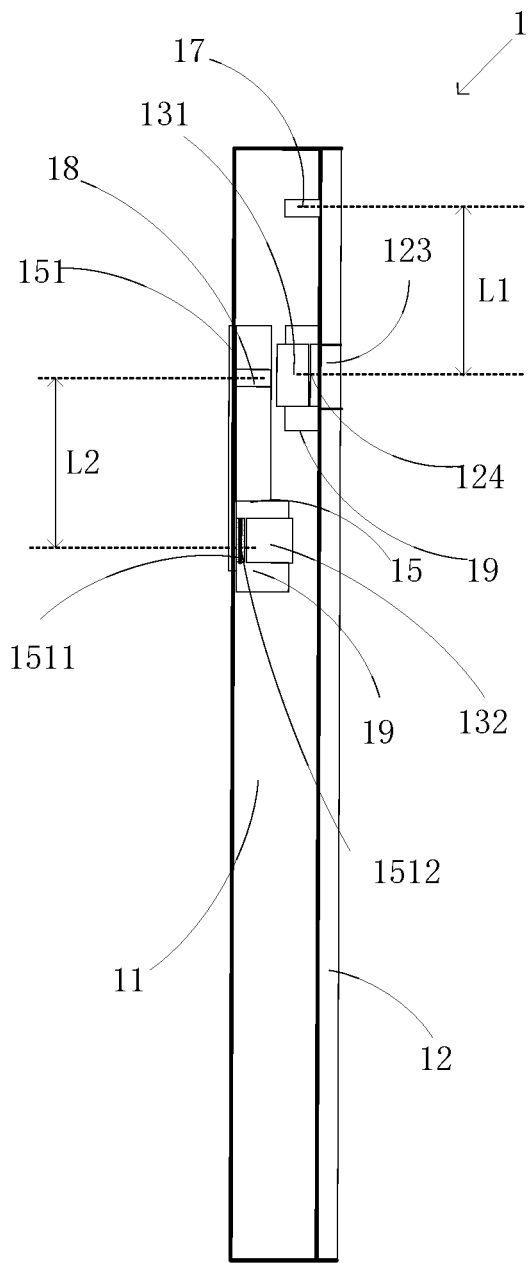
FIG. 5 is a fourth cross-sectional view of an electronic device in an example of the present disclosure.

As shown in FIGS. 4 and 5, the electronic device 1 further includes a camera module 15. The camera module 15 is arranged on the second assembly surface 112. The camera module 15 includes a camera body and a cover plate 151. The cover plate 151 covers the camera body, and the second light sensing unit 132 is disposed beneath the cover plate 151 to realize a reception of ambient light through the cover plate 151 of the camera module 15. The second light sensing unit 132 realizes the reception of ambient light by means of the cover plate 151 of the camera module 15, thereby avoiding additionally opening on a rear housing of the electronic device 1, also improving the integration of the light sensing module 13 with the camera module 15 in the electronic device 1, and enabling the external appearance of the electronic device 1 to be more aesthetic.

In the above example, the cover plate 151 includes outer and inner side surfaces arranged opposite to each other, and a light transmitting ink layer 1511 is provided on a portion of the inner side surface which is corresponding to the second light sensing unit 132. The second light sensing unit 132 is disposed beneath the cover plate 151, and the light transmitting ink layer 1511 covers the second light sensing unit 132. In this way, on the one hand, the external ambient light may be transmitted to the second light sensing unit 132 through the light transmitting ink layer 1511. On the other hand, by the blocking of the light transmitting ink layer 1511, the second light sensing unit 132 is not seen from outside, which would otherwise affects the aesthetics of the electronic device 1.

The light transmitting ink layer 1511 has a characteristic dimension greater than a characteristic dimension of the second light sensing unit 132, so as to cover the second light sensing unit 132 using the light transmitting ink layer 1511, so that external ambient light may pass through the light transmitting ink layer 1511 and enter the second light sensing unit 132, which may prevent other light shielding structures of the cover plate 151 from interfering in the light receiving angle of the second light sensing unit 132. The characteristic dimension is such a dimension representing the shape and size of the light transmitting ink layer 1511 and the second light sensing unit 132, respectively. For example, when cross-sectional shapes of both the light transmitting ink layer 1511 and the second light sensing unit 132 are circular, the characteristic dimension of the light transmitting ink layer 1511 may be a radius of the circular cross section thereof, and the characteristic dimension of the second light sensing unit 132 may be a radius of a circular cross section thereof. The radius of the circular cross section of the light transmitting ink layer 1511 is larger than the radius of the circular cross section of the second light sensing unit 132. For another example, when the cross sectional shapes of both the light transmitting ink layer 1511 and the second light sensing unit 132 are different, the characteristic dimension of the light transmitting ink layer 1511 may be a distance m from an edge to a center of the cross section of the light transmitting ink layer 1511. The characteristic dimension of the second light sensing unit 132 may be a distance n from an edge to a center of the cross section of the second light sensing unit 132. In the same orientation, the distance m is larger than the distance n. In some examples, in the same orientation, the distance m is larger than the distance n by at least 0.2 mm.

In one example, the cross-sectional shapes of the light transmitting ink layer 1511 and the second light sensing unit 132 are circular, and the characteristic dimension of the light transmitting ink layer 1511, i.e. the radius of the circular cross section, is larger than or equal to 0.6 mm. The characteristic dimension of the second light sensing unit 132, i.e. the radius of the circular cross section, is less than 0.4 mm.

In another example, the light transmitting ink layer 1511 has a light transmittance higher than 0.2%. According to the different filter effects of the filters used in the light sensing module 13 for the ambient light, when the light that enters the second light sensing unit 132 after passing through the filter is in a wavelength band of 320 nm to 780 nm, the light transmittance of light transmitting ink layer 1511 may be enabled to be higher than 0.2%, so as to obtain better light sensing and blocking effects. When the light that enters the second light sensing unit 132 after passing through the filter has a wavelength of 940 nm, the light transmittance of light transmitting ink layer 1511 may be enabled to be lower than 3%, so as to obtain better light sensing and blocking effects.

In still another example, the distance between the inner side surface of the cover plate 151 and a light sensing surface of the second light sensing unit 132 is less than or equal to 2.6 mm, so as to avoid decreasing the light receiving angle of the second light sensing unit 132 due to the excessive distance between the inner side surface and the light sensing surface of the second light sensing unit 132. Further, the second light sensing unit 132 has a light receiving angle greater than or equal to 35°, so as to ensure that the first light sensing unit 131 and the second light sensing unit 132 cooperate to obtain a three-dimensional sensing effect of the ambient light.

In some examples, as shown in FIG. 5, the electronic device 1 further includes elastic positioning member(s) 19. The elastic positioning member(s) 19 are disposed inside the device body 11 and fitted or mated with the first light sensing unit 131 and the second light sensing unit 132, so as to define and fix the positions of the first light sensing unit 131 and the second light sensing unit 132 and fix relative positions thereof too. The electronic device 1 may include two elastic positioning members 19, and the two elastic positioning members 19 are fitted or mated with the first light sensing unit 131 and the second light sensing unit 132, respectively. Alternatively, the electronic device 1 may include one elastic positioning member 19. The elastic positioning member 19 includes two positioning portions, and the two positioning portions are fitted or mated with the first light sensing unit 131 and the second light sensing unit 132, respectively. The material of the elastic positioning member 19 may be an elastic material such as rubber, which is not limited in this disclosure.

In other examples, the electronic device 1 further includes a first self-luminous member 17 arranged on the first assembly surface 111 and/or a second self-luminous member 18 arranged on the second assembly surface 112. When the electronic device 1 includes the first self-luminous member 17 and the second self-luminous member 18, a distance L1 between the first self-luminous member 17 and the first light sensing unit 131 is greater than 20 mm, and a distance L2 between the second self-luminous member 18 and the second light sensing unit 132 is greater than 20 mm, so as to prevent the first self-luminous member 17 from interfering in the light sensing effect of the first light sensing unit 131, and to prevent the second self-luminous member 18 from interfering in the light sensing effect of the second light sensing unit 132.

In the above examples, the first self-luminous member 17 may be a breathing lamp, decorative lamp, or the like. And the second self-luminous member 18 may be a flash lamp, the breathing lamp, the decorative lamp, or the like.

Figure 6:
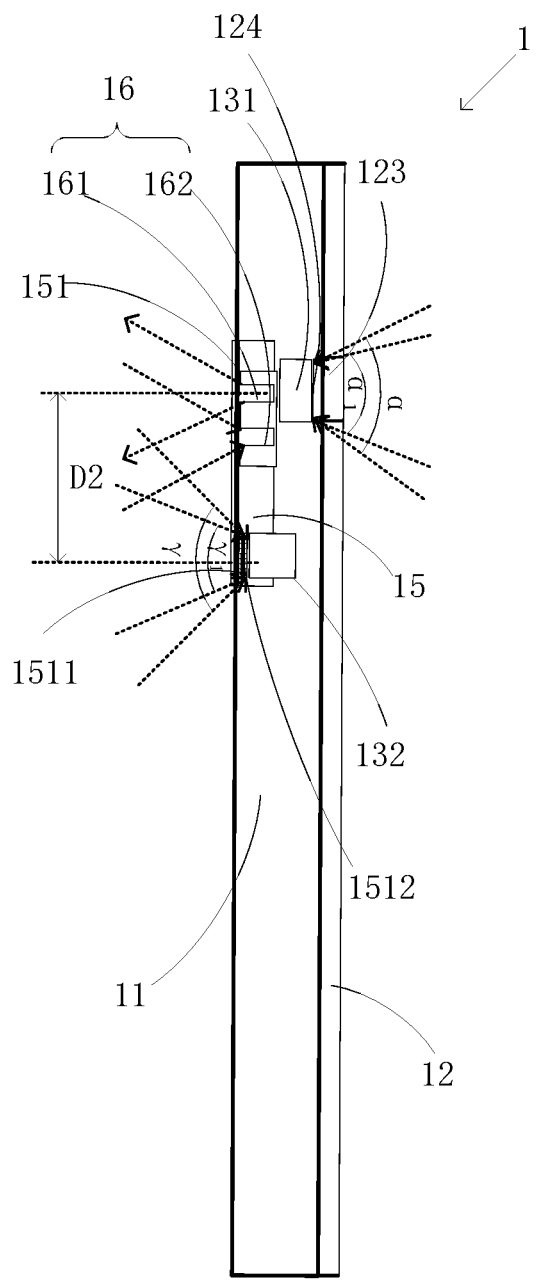
FIG. 6 is a fifth cross-sectional view of an electronic device in an example of the present disclosure.

As shown in FIG. 6, the second light sensing unit 132 is disposed beneath the cover plate 151 of the camera module 15, and a second distance sensing module 16 is also provided beneath the cover plate 151. The second distance sensing module 16 includes a second infrared emitting element 161 and a second infrared receiving element 162. The second distance sensing module 16 may be used for the camera module 15, so as to realize a focusing function of the camera module 15 through the emission and reception of infrared light. A distance D2 between the second infrared emitting element 161 and the second light sensing unit 132 is greater than 20 mm, which may prevent the infrared emission from interfering in the sensing of the second light sensing unit 132. The second light sensing unit 132 receives the ambient light at one side of the second assembly surface 112 through the light transmitting ink layer 1511 of the cover plate 151, and forms a light receiving angle γ as shown in FIG. 6.

In one example, a second light diffusing layer 1512 covering the light transmitting ink layer 1511 is further provided on the light transmitting ink layer 1511. The second light diffusing layer 1512 may increase the angle for receiving external ambient light and increase the uniformity of the lights incident on the second light sensing unit 132, thereby further improving the light sensing effect of the second light sensing unit 132. As shown in FIG. 6, after additionally providing the second light diffusing layer 1512, the light receiving angle of the second light sensing unit 132 increases from $γ_1$ to γ.

Combing both of the light receiving angle α of the first light sensing unit 131 and the light receiving angle γ of the second light sensing unit 132, the light sensing module 13 may obtain a three-dimensional light sensing effect around the electronic device 1 and may sense ambient light around the electronic device 1. In this way, the ambient light sensing angle of the electronic device 1 is increased, and the cover area of the sensed ambient light is further increased, which improves the adaptability of the screen brightness to ambient light.

In addition, the electronic device 1 further includes an auxiliary function module (not shown). The device body 11 further includes a mainboard, the auxiliary function module and the light sensing module 13 are electrically connected to the mainboard, respectively, so as to transmit light sensing data or light sensing parameters of both the first light sensing unit 131 and the second light sensing unit 132 to the mainboard. The auxiliary function module may obtain the light sensing data at the mainboard and use the above light sensing data. The auxiliary function module may be a playback module, the camera module 15, a power module, and other modules of the electronic device 1, so that the playback function, the photographing function, the charge and discharge function may be associated with the light sensing data of the first light sensing unit 131 and the second light sensing unit 132, which is not limited in the present disclosure. Further, the light sensing data may also be applied by any application program in the electronic device 1 to enrich functions for the application program.

It should be noted that the electronic device 1 may be a mobile phone, a tablet computer, an in-vehicle terminal, a medical terminal, or the like, which is not limited by this disclosure.

Figure 7:
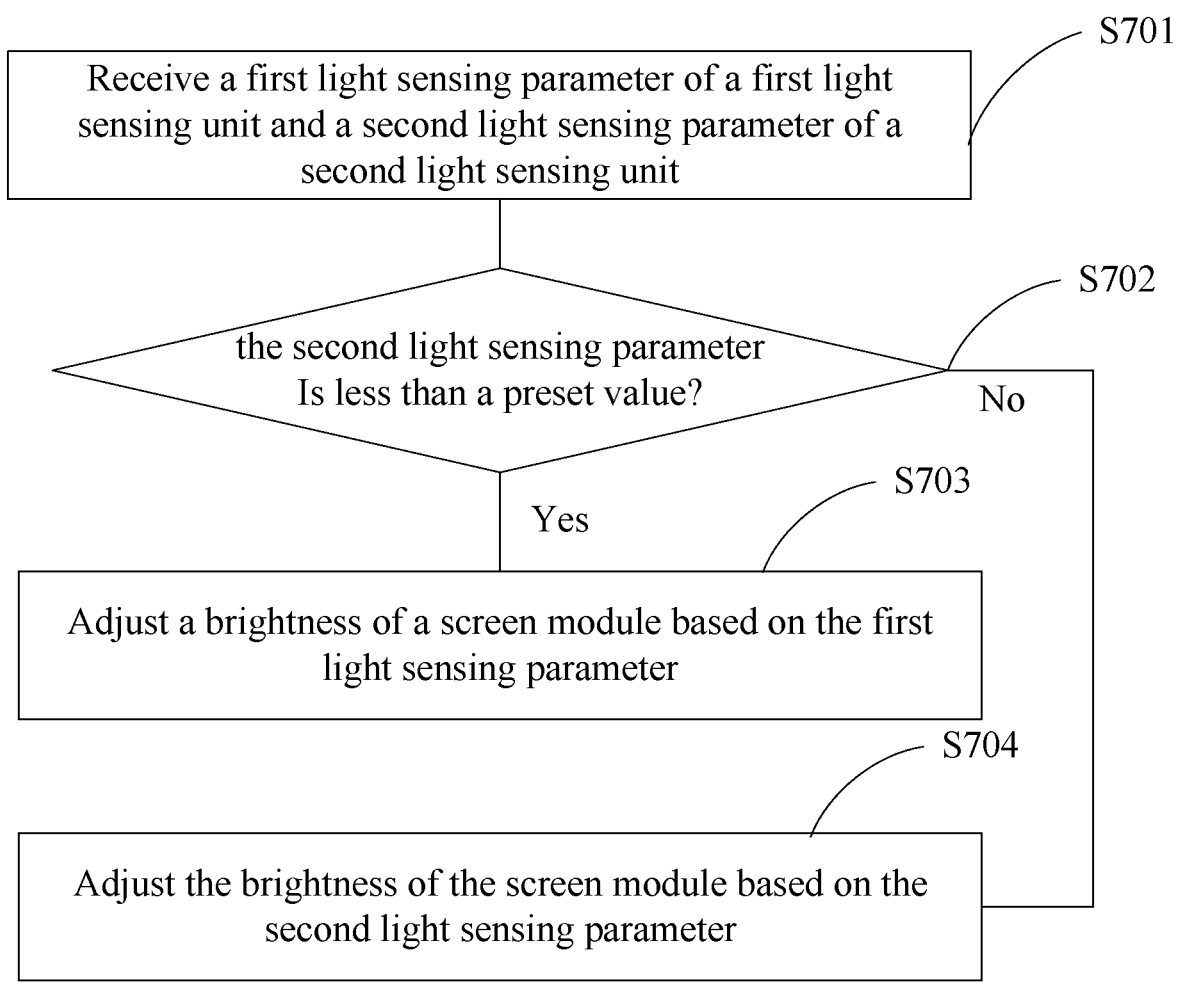
FIG. 7 is a flowchart illustrating a method of light sensing and brightness controlling in an example of the present disclosure.

The present disclosure further provides a method of light sensing and brightness controlling, which is applicable to the above electronic device. FIG. 7 is a flowchart of a method of light sensing and brightness controlling in an example of the present disclosure. As shown in FIG. 7, the method of light sensing and brightness controlling may be implemented through the following steps S701 to S704.

At step S701, a first light sensing parameter of a first light sensing unit and a second light sensing parameter of a second light sensing unit are received.

At step S702, it is determined whether the second light sensing parameter is less than a preset value, and at step S703, when the second light sensing parameter is less than the preset value, a brightness of a screen module is adjusted based on the first light sensing parameter; otherwise, at step S704, the brightness of the screen module is adjusted based on the second light sensing parameter.

For example, when a user uses an electronic device while standing or walking on a road at night, the first light sensing unit senses the ambient light from the side of the first assembly surface and generates the first light sensing parameter, and the second light sensing unit senses the ambient light from the side of the second assembly surface and generates a second light sensing parameter. In general, since the overall ambient light on the road at night is weak, the second light sensing parameter is less than the preset value. Thus, the screen brightness is adjusted to a lower brightness based on the first light sensing parameter to adapt to ambient light, which enhances the comfort of human eyes. When a car is approaching from the opposite direction, light of the vehicle coming from the opposite direction suddenly increases the brightness of ambient light at the side of the second assembly surface of the device body, so that the second light sensing parameter is greater than the preset value, e.g., 50 lux to 200 lux. Thus, the brightness of the screen is adjusted to a higher brightness based on the second light sensing parameter to adapt to the ambient light, thereby improving the comfort of the human eyes, increasing the adaptability of the human eyes to the ambient light, and further improving the experience and the safety of using the electronic device.

In addition, the electronic device also includes the auxiliary function module, and the device body further includes the mainboard. The auxiliary function module and the light sensing module are electrically connected to the mainboard to transmit the light sensing data or the light sensing parameters of both the first light sensing unit and the second light sensing unit to the mainboard. The auxiliary functional module may obtain the light sensing data at the mainboard and use the light sensing data. The auxiliary function module may be a playback module, a camera module, a power module, and other modules of the electronic device, so that the playback function, the photographing function, the charge and discharge function may be associated with the light sensing data of both the first light sensing unit and the second light sensing unit, which is not limited in the present disclosure. Further, the light sensing data may also be applied to any application program in the electronic device to enrich functions of the application program.

The light sensing module includes the first light sensing unit and the second light sensing unit, and the first light sensing unit is arranged on the first assembly surface of the device body, and the second light sensing unit is arranged on the second assembly surface of the device body. Since the first assembly surface and the second assembly surface are arranged opposite to each other, the first light sensing unit and the second light sensing unit may sense the ambient light at the opposite sides of the device body and adjust the brightness of the screen module arranged on the first assembly surface with reference to the changes in the ambient light at both sides of the device body. The above structural arrangement may increase the ambient light sensing angle of the electronic device, and further increase the cover area of the sensed ambient light, which improves the adaptability of the screen brightness to the ambient light.

Figure 8:
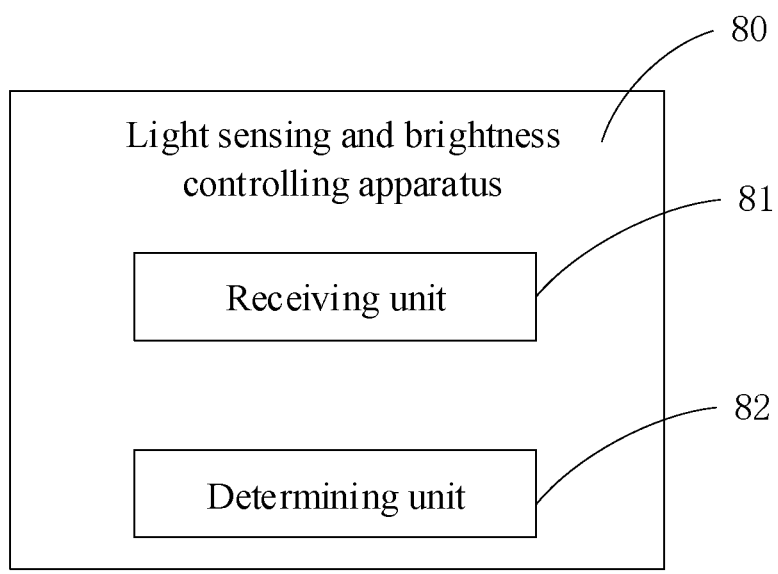
FIG. 8 is a block diagram illustrating an apparatus of light sensing and brightness controlling in an example of the present disclosure.

According to the above examples, the present disclosure further provides an apparatus for light sensing and brightness controlling, which is applicable to the above electronic device. FIG. 8 is a block diagram illustrating an apparatus for light sensing and brightness controlling in an example of the present disclosure. As shown in FIG. 8, the apparatus for light sensing and brightness controlling 80 includes a receiving unit 81 and a determining unit 82.

The receiving unit 81 is configured to receive the first light sensing parameter of the first light sensing unit and the second light sensing parameter of the second light sensing unit.

The determining unit 82 is configured to determine whether the second light sensing parameter is less than the preset value, and when the second light sensing parameter is less than the preset value, the brightness of the screen module is adjusted based on the first light sensing parameter, otherwise the brightness of the screen module is adjusted based on the second light sensing parameter.

Regarding the apparatus in the above example, the specific manner in which each module performs operations has been described in detail in the examples related to the method, which will not be elaborated herein.

As for the examples of apparatus, since the examples of apparatus substantially correspond to the examples of method, a reference may be made to a part of the descriptions of the examples of method regarding the associated part. The examples of apparatus described above are merely illustrative, where the units described as separate parts may or may not be physically separate, and the parts displayed as units may or may not be physical units, e.g., may be located in one position, or may be distributed on a plurality of network units. Some or all of the modules may be selected according to actual requirements to achieve the objectives of the solutions in the examples. Those of ordinary skill in the art may understand and carry out them without creative work.

Correspondingly, the present disclosure also provides a light sensing and brightness controlling apparatus, including: a processor; a memory configured to store instructions may be executed by the processer. The processor is configured to receive a first light sensing parameter of a first light sensing unit and a second light sensing parameter of a second light sensing unit; and determine whether the second light sensing parameter is less than a preset value. When the second light sensing parameter is less than the preset value, a brightness of a screen module is adjusted based on the first light sensing parameter; otherwise, the brightness of the screen module is adjusted based on the second light sensing parameter.

The present disclosure can also provide a terminal including a memory and one or more programs. The one or more programs are stored in the memory and are configured, so as to cause the one or more processors to execute instructions which are contained in the one or more programs to perform the following operations: receive the first light sensing parameter of the first light sensing unit and the second light sensing parameter of the second light sensing unit. It is determined whether the second light sensing parameter is less than the preset value. When the second light sensing parameter is less than the preset value, the brightness of the screen module is adjusted based on the first light sensing parameter; otherwise, the brightness of the screen module is adjusted based on the second light sensing parameter.

Figure 9:
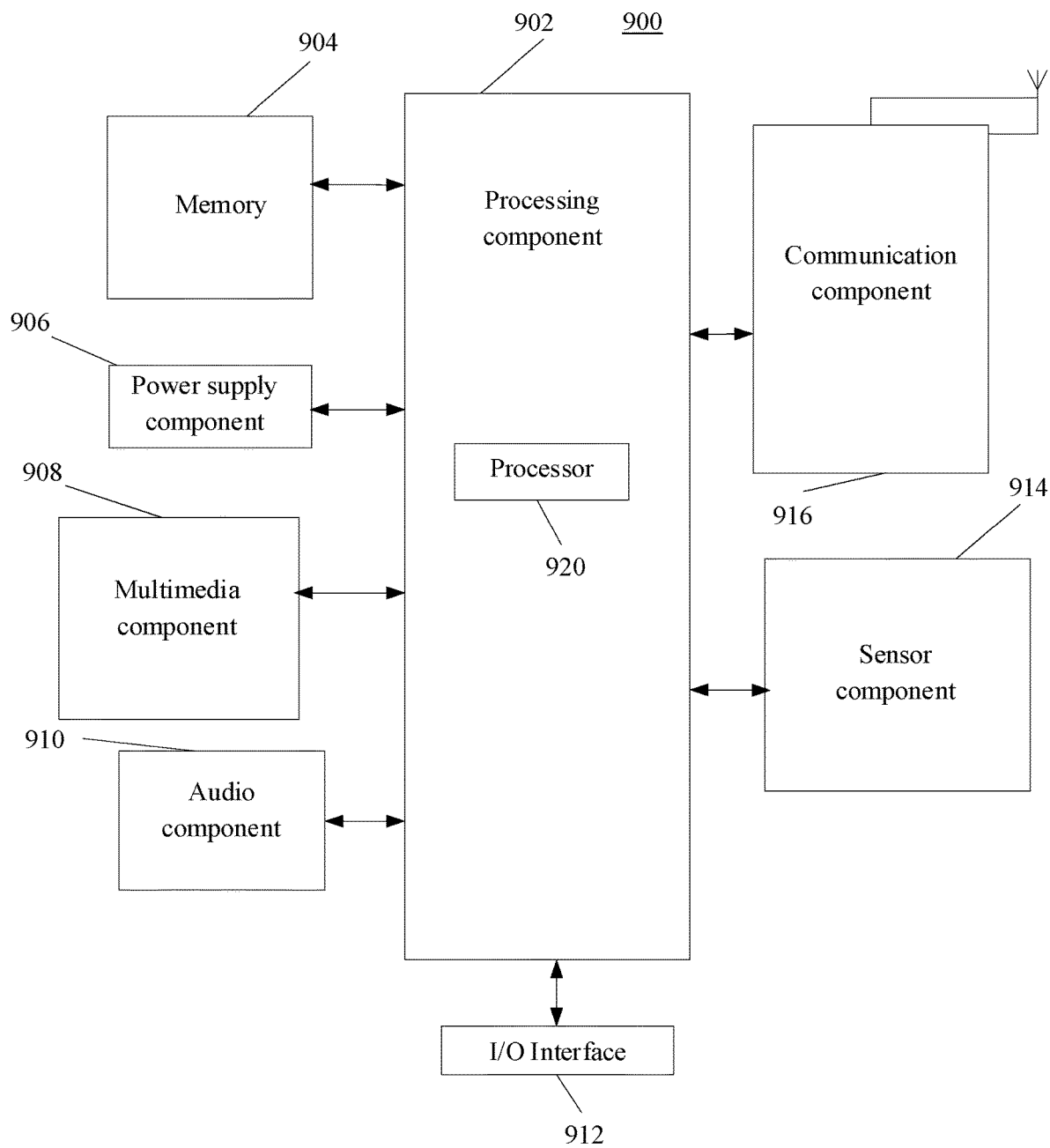
FIG. 9 is another block diagram illustrating a structure of an apparatus for light sensing and brightness controlling in an example of the present disclosure.

FIG. 9 is another block diagram illustrating a structure of a light sensing and brightness controlling apparatus according to an example. For example, the light sensing and brightness controlling apparatus 900 may be a mobile phone, a computer, a digital broadcasting terminal, a messaging device, a game console, a tablet device, a medical device, fitness equipment, a personal digital assistant, or the like.

As shown in FIG. 9, the light sensing and brightness controlling apparatus 900 may include one or more of the following components: a processing component 902, a memory 904, a power supply component 906, a multimedia component 908, an audio component 910, an input/output (I/O) interface 912, a sensor component 914, and a communication component 916.

The processing component 902 generally controls overall operations of the light sensing and brightness controlling apparatus 900, such as operations associated with display, phone calls, data communications, camera operations, and recording operations. The processing component 902 may include one or more processors 920 to execute instructions, so as to complete all or some of the steps of the above methods. In addition, the processing component 902 may include one or more modules which facilitate the interaction between the processing component 902 and other components. For example, the processing component 902 may include a multimedia module to facilitate the interaction between the multimedia component 908 and the processing component 902.

The memory 904 is configured to store various types of data to support the operation of the light sensing and brightness controlling apparatus 900. Examples of such data include instructions for any application or method operated on the light sensing and brightness controlling apparatus 900, contact data, phonebook data, messages, pictures, videos, and so on. The memory 904 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 906 supplies power for different components of the light sensing and brightness controlling apparatus 900. The power supply component 906 may include a power supply management system, one or more power supplies, and other components associated with generation, management and distribution for the power of the light sensing and brightness controlling apparatus 900.

The multimedia component 908 includes a screen providing an output interface between the light sensing and brightness controlling apparatus 900 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, slippages, and gestures on the TP. The touch sensors may not only sense a boundary of the touch or the slippage, but also sense a duration time and a pressure associated with the touch or the slippage. In some examples, the multimedia component 908 may include a front camera and/or a rear camera. The front camera and/or rear camera may receive external multimedia data when the light sensing and brightness controlling apparatus 900 is in an operating mode, such as a photographing mode or a video mode. The front camera and the rear camera may be a fixed optical lens system or have the capability of focal length and optical zooming, respectively.

The audio component 910 is configured to output and/or input an audio signal. For example, the audio component 910 includes a microphone (MIC). When the light sensing and brightness controlling apparatus 900 is in an operating mode, such as a call mode, a record mode and a voice recognition mode, the microphone is configured to receive an external audio signal. The received audio signal may be further stored in the memory 904 or sent via the communication component 916. In some examples, the audio component 910 further includes a speaker for outputting an audio signal.

The I/O interface 912 provides an interface between the processing component 902 and a peripheral interface module. The above peripheral interface module may be a keyboard, a click wheel, buttons, or the like. These buttons may include but not limited to, a home button, a volume button, a start button and a lock button.

The sensor component 914 includes one or more sensors to provide status assessments of various aspects for the light sensing and brightness controlling apparatus 900. For example, the sensor component 914 may detect the on/off status, and relative positioning of components of the light sensing and brightness controlling apparatus 900. For example, the components are a display and a keypad of the light sensing and brightness controlling apparatus 900. The sensor component 914 may also detect a change in position of the light sensing and brightness controlling apparatus 900 or a component of the light sensing and brightness controlling apparatus 900, a presence or absence of the contact between a user and the light sensing and brightness controlling apparatus 900, an orientation or an acceleration/deceleration of the light sensing and brightness controlling apparatus 900, and a change in temperature of the light sensing and brightness controlling apparatus 900. The sensor component 914 may include a proximity sensor configured to detect the presence of a nearby object without any physical contact. The sensor component 914 may further include an optical sensor, such as a Complementary Metal-Oxide-Semiconductor (CMOS) or Charged Coupled Device (CCD) image sensor which is used in imaging applications. In some examples, the sensor component 914 may further include an acceleration sensor, a gyroscope sensor, a magnetic sensor, a pressure sensor, or a temperature sensor.

The communication component 916 is configured to facilitate wired or wireless communication between the light sensing and brightness controlling apparatus 900 and other devices. The light sensing and brightness controlling apparatus 900 may access a wireless network based on a communication standard, such as Wi-Fi, 2G or 3G, 4G LTE, 5G NR or a combination thereof. In an example, the communication component 916 receives a broadcast signal or broadcast related information from an external broadcast management system via a broadcast channel. In an example, the communication component 916 may further include a Near Field Communication (NFC) module for promoting short-range communication. For example, the NFC module may be implemented based on a radio frequency identification (RFID) technology, an infrared data association (IrDA)

technology, an ultra-wideband (UWB) technology, a Bluetooth® (BT) technology and other technologies.

In an example, the light sensing and brightness controlling apparatus 900 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

The present disclosure further provides a computer-readable storage medium on which computer instructions are stored. And when the computer instructions are executed by a processor, the steps of the light sensing and brightness controlling method are implemented. In an example, a non-transitory computer readable storage medium including instructions is further provided, such as the memory 904 including instructions. The above instructions may be executed by the processor 920 of the light sensing and brightness controlling apparatus 900 to complete the light sensing and brightness controlling method. For example, the non-transitory computer readable storage medium may be a Read-Only Memory (ROM), a Random Access Memory (RAM), a CD-ROM, a magnetic tape, a floppy disk, an optical data storage device, and so on.

Some other embodiments of the present disclosure can be apparent to those skilled in the art upon consideration of the specification and practice of the present disclosure herein. The present disclosure is intended to cover any variations, uses, modification or adaptations of the present disclosure following the general principles of the present disclosure and include common general knowledge or conventional technical means in the related art without departing the present disclosure. The specification and examples can be shown as illustrative only, and the true scope and spirit of the present disclosure are indicated by the following claims.

It is to be understood that the present disclosure is not limited to the precise structure described above and shown in the accompanying drawings, and that various modifications and changes can be made without departing from the scope thereof. The scope of the present disclosure is limited only by the appended claims.

The invention claimed is:

1. An electronic device, comprising:
a device body comprising a first assembly surface and a second assembly surface arranged opposite to each other;
a screen module fitted on the first assembly surface; and
a light sensing module electrically connected to the screen module, wherein the light sensing module comprises:
a first light sensing unit fitted on the first assembly surface; and
a second light sensing unit fitted on the second assembly surface,
wherein the electronic device further comprises one or more elastic positioning members that are mated with the first light sensing unit and the second light sensing unit, such that positions of the first light sensing unit and the second light sensing unit are fixed.

2. The electronic device according to claim 1, wherein the screen module is provided with a light transmitting area, and
the first light sensing unit is disposed beneath the screen module and corresponding to the light transmitting area.

3. The electronic device according to claim 2, the screen module further comprising a display layer and a light shielding layer, wherein:
the display layer includes a top surface and a bottom surface disposed opposite to each other,
the light shielding layer is arranged on the bottom surface, and
a portion of the light shielding layer that corresponds to the light transmitting area is provided with a light transmitting portion.

4. The electronic device according to claim 1, further comprising:
a first infrared emitting element arranged on the first assembly surface and/or a second infrared emitting element arranged on the second assembly surface,
wherein a distance between the first infrared emitting element and the first light sensing unit is greater than 20 mm, and a distance between the second infrared emitting element and the second light sensing unit is greater than 20 mm.

5. The electronic device according to claim 1, wherein the second light sensing unit has a light receiving angle that is greater than or equal to 35°.

6. An electronic device, comprising:
a device body comprising a first assembly surface and a second assembly surface arranged opposite to each other;
a screen module fitted on the first assembly surface: and
a light sensing module electrically connected to the screen module, wherein the light sensing module comprises:
a first light sensing unit fitted on the first assembly surface; and
a second light sensing unit fitted on the second assembly surface,
wherein the electronic device further comprises a first self-luminous member fitted on the first assembly surface and/or a second self-luminous member fitted on the second assembly surface, and
wherein a distance between the first self-luminous member and the first light sensing unit is greater than 20 mm, and a distance between the second self-luminous member and the second light sensing unit is greater than 20 mm.

7. An electronic device, comprising:
a device body comprising a first assembly surface and a second assembly surface arranged opposite to each other;
a screen module fitted on the first assembly surface; and
a light sensing module electrically connected to the screen module, wherein the light sensing module comprises:
a first light sensing unit fitted on the first assembly surface; and
a second light sensing unit fitted on the second assembly surface,
wherein the electronic device further comprises a camera module fitted on the second assembly surface; the camera module comprises a camera body and a cover plate covering the camera body, and the second light sensing unit is disposed beneath the cover plate,
the cover plate comprises an outer side surface and an inner side surface opposite to each other, and
a light transmitting ink layer is provided on a portion of the inner side surface that is corresponding to the second light sensing unit.

8. The electronic device according to claim 7, wherein the light transmitting ink layer has a characteristic dimension greater than a characteristic dimension of the second light sensing unit.

9. The electronic device according to claim 8, wherein the light transmitting ink layer has the characteristic dimension greater than or equal to 0.6 mm.

10. The electronic device according to claim 7, wherein the light transmitting ink layer has a light transmittance higher than 0.2%.

11. The electronic device according to claim 7, wherein a distance between the inner side surface and a light sensing surface of the second light sensing unit is less than or equal to 2.6 mm.

12. The electronic device according to claim 7, wherein a second light diffusing layer covering the light transmitting ink layer is provided on the light transmitting ink layer.

* * * * *